(12) United States Patent
Reeves, Jr.

(10) Patent No.: US 7,178,163 B2
(45) Date of Patent: Feb. 13, 2007

(54) CROSS PLATFORM NETWORK AUTHENTICATION AND AUTHORIZATION MODEL

(75) Inventor: Charles R. Reeves, Jr., Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 10/292,322

(22) Filed: Nov. 12, 2002

(65) Prior Publication Data

US 2004/0093515 A1 May 13, 2004

(51) Int. Cl.
G06F 15/16 (2006.01)
G06F 15/173 (2006.01)

(52) U.S. Cl. .................. 726/2; 726/1; 726/8; 726/9; 726/10; 713/182; 709/203; 709/225

(58) Field of Classification Search .............. 726/1, 726/2, 8–10; 713/182; 709/203, 225
See application file for complete search history.

(56) References Cited

U.S. PATENT DOCUMENTS 6,189,036 B1 * 2/2001 Kao ........................ 709/229
6,732,172 B1 * 5/2004 House et al. ............... 709/225
7,006,997 B2 * 2/2006 Hori ............................ 705/57
2003/0135628 A1 * 7/2003 Fletcher et al. ............. 709/229
2003/0163691 A1 * 8/2003 Johnson ...................... 713/168
2005/0049955 A1 * 3/2005 Kohnhorst et al. ........... 705/37

* cited by examiner

Primary Examiner—Taghi T. Arani
(74) Attorney, Agent, or Firm—Workman Nydegger

(57) ABSTRACT

A model for authentication and authorization of users and applications that use network services. A client requests a ticket by providing credentials (user ID and password), e.g., over HTTP/SOAP/XML in the UDDI framework. An authentication adapter in a receiving server deserializes the request into a data structure that provides access to the security ID and password attributes, and passes these attributes to an ID management system to perform authentication. The credentials also determine the user's or application's privileges. The authentication adapter constructs a ticket object for the client incorporating the privileges and other information, e.g., the security ID and a date/time stamp. The ticket object is serialized, encrypted, encoded for transmission and inserted into an appropriately-formatted XML message and returned to the requesting client. The client attaches the authentication ticket to subsequent service requests that require authentication. To validate the ticket, the ticket object is reconstructed from the request data.

52 Claims, 5 Drawing Sheets

CROSS PLATFORM NETWORK AUTHENTICATION AND AUTHORIZATION MODEL

FIELD OF THE INVENTION

The invention relates generally to computer systems and networks, and more particularly to network security via authentication and authorization.

BACKGROUND OF THE INVENTION

There are many types of computing services, resources and data that computer users and applications need to manage and otherwise access, such as services and data maintained on corporate networks and other remotely accessible sites including intranets and the internet. As there are many different computing platforms, various platform-independent mechanisms and protocols that facilitate the exchange of network information are becoming commonplace, including HTTP (HyperText Transfer Protocol), XML (extensible Markup Language), XML Schema, and SOAP (Simple Object Access Protocol) XML. The concept of web services, in which businesses, organizations, and other providers offer services to users and applications, is based on these standards.

To be of value, web services need to enable users and applications to locate them, and exchange the information needed to execute them. To this end, UDDI (Universal Description Discovery & Integration) provides a set of defined services (e.g., in a universal business registry) that help users and applications discover such businesses, organizations, and other web services providers, along with a description of their available web services and the technical interfaces needed to access those services.

However, much of the services, resources and data offered on networks need to be secure, and networks also need to limit the requesting entity to only actions and information for which the entity is authorized. Although UDDI contemplates the need for security, there is no particular mechanism to accomplish authentication and authorization in UDDI, let alone one that can leverage existing security infrastructures. What is needed is a way for authentication and authorization to be performed within the framework of UDDI or a similar platform-independent framework that can leverage security infrastructures, including those that presently exist and those yet to be developed.

SUMMARY OF THE INVENTION

Briefly, the present invention provides a system and method for authentication and authorization of users and applications of network services. A client, running on essentially any platform, may use a defined protocol such as SOAP (Simple Object Access Protocol) to be authenticated and authorized to access network services. The identification management system or systems that handle authentication and authorize access rights need not be of the same platform as the requesting client. Further, the authentication and authorization model can operate within the defined UDDI API (application programming interface) framework.

A client requests a ticket, such as by providing credentials (a security ID and password) over HTTP, and the request is received by a server as a stream of data. An authentication adapter in the server deserializes the stream of data into a data structure that provides the authentication adapter with access to the security (e.g., user) ID and password attributes. For example, in the implementation in which a get_authToken XML SOAP message is received, serialization converts the request data into an instance of an object class in memory, providing direct access to the attributes in the request, and in particular the security ID and password attributes. With the credentials, the server initiates authentication by passing the appropriate credentials to an ID management system. For example, this may be accomplished by invoking a Windows®-based LogonUser API. If authenticated, the authentication adapter further uses the credentials to determine the user's or application's role (e.g., access rights and privileges, or the like).

The authentication adapter then constructs a ticket for the user or application incorporating the role data. For example, an instance of a ticket class is created in memory, and is initialized with the identity of the user/application, the privileges (role) associated with the user/application, a date/time stamp indicating the time at which the ticket was created, and random data. To prepare the ticket for return, the authentication adapter serializes the ticket object into a sequential stream of bytes, which is then encrypted to secure it by cryptographically encoding the bytes. The stream is then prepared for transmission, e.g., UUEncoded for transmission as part of an XML message over the HTTP protocol. At this time, the message including the ticket can be returned to the requesting client.

The client may attach a copy of the authentication ticket to subsequent service requests that require authorization, (e.g., save_service or delete_tModel in a UDDI environment). To validate the ticket and handle the service request, a receiving server reconstructs the ticket data into a form that can be evaluated, such as by rebuilding a ticket object. To this end, a ticket extraction mechanism deserializes the request into a data structure such as an object that provides random access to the ticket data, e.g., within the UDDI <auth_Info> tag. The ticket data is then UUDecoded back into binary data, and the stream decrypted with the appropriate counterpart decryption algorithm.

Once decrypted, the ticket data is deserialized back into an instance of the ticket object, including the important authorization information of ID, role and date/timestamp. In this form, the server has random access to the ticket data, which may be evaluated to determine whether the user's or application's accompanying request is authorized, and if so, to provide the requested service.

Other advantages will become apparent from the following detailed description when taken in conjunction with the drawings, in which:

DETAILED DESCRIPTION

Exemplary Operating Environment

Figure 1:
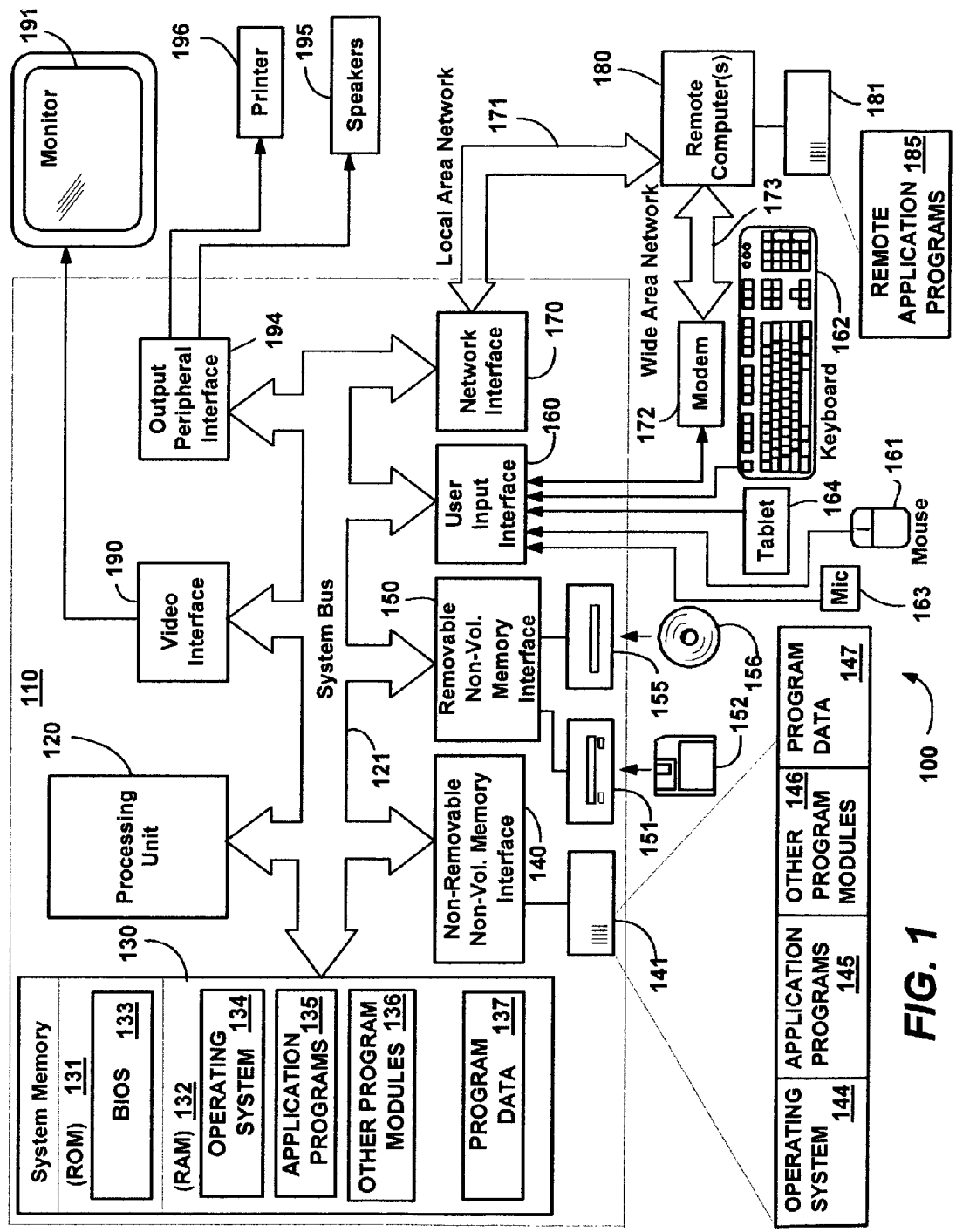
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Authentication and Authorization

The present invention is generally directed towards a model for authentication and authorization of users and applications of network services, in which a client running on essentially any platform may use a defined protocol such as SOAP (Simple Object Access Protocol) to be authenticated and authorized to access network services. The identification management system or systems that handle authentication and authorize access rights need not be of the same platform as the requesting client. For example, in one implementation, the accounts, policies and other security infrastructure provided by a Microsoft® Windows® (e.g., Windows® .NET Server 2003) platform offer an effective environment for managing the access control for implementations of the Universal Description Discovery and Integration (UDDI) Application Programming Interface (API), versions 1, 2 and 3. The present invention thus provides for the authentication and authorization of users and applications of the UDDI API that leverages a Microsoft® Windows® operating system (e.g., Windows® .NET Server 2003) security infrastructure and API set, yet fully preserves the ability for clients on both Microsoft (e.g., Windows® .NET) platforms and non-Microsoft platforms to leverage the API. Note, however, that while the present invention will be primarily described with respect to SOAP, XML, UDDI, and/or Windows®/.NET, it is understood that the present invention is not limited to any particular implementation, protocols, components, APIs, and so on, but also encompasses like mechanisms for requesting and receiving network services.

Figure 2:
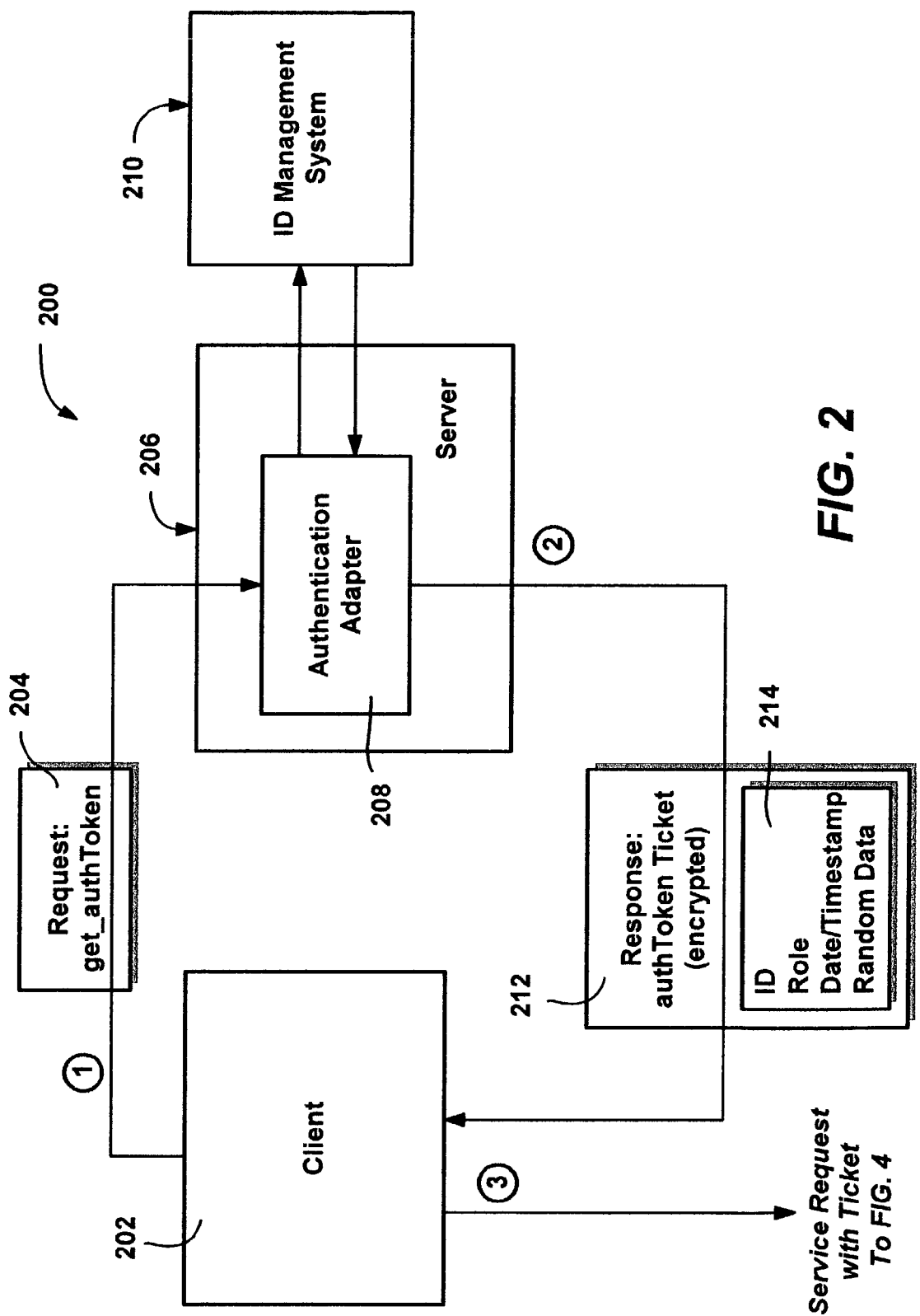
FIG. 2 is a block diagram generally representing the exchange of a ticket request and response in accordance with an aspect of the present invention.

FIG. 2 is a representation of a network 200 that provides a client 202 with an authentication and authorization service, such as to obtain a ticket (token) or similar credential set that gives the client access rights to other network services (e.g., web services). In general, as represented in FIG. 2 by the arrow labeled one (1), the client 202 requests a ticket, such as via a hypertext transfer protocol (HTTP) request 204, which is received by a server 206. For example, the UDDI API specifications (version 1.0, 2.0 and 3.0) require authentication of users and applications through the submission of a get_authToken SOAP request message. Such an example request 204, shown in FIG. 2, contains attributes including a security identifier (example userID="MYDOMAIN\MYACCOUNT") and password attribute named cred (example cred="MYPASSWORD") as shown in the formatted example message below:

```
<?xml version="1.0" encoding="UTF-8" ?>
<Envelope xmlns="http://schemas.xmlsoap.org/soap/envelope/">
  <Body>
     <get_authToken xmlns="urn:uddi-org:api_v2" generic="2.0"
        userID="MYDOMAIN\MYACCOUNT"
        cred="MYPASSWORD"
     />
  </Body>
</Envelope>
```

An authentication adapter 208 extracts the appropriate credentials (e.g., security ID and password data) from the request data 204, as described below, and provides that data in an appropriate format to an authentication mechanism, shown in FIG. 2 as the ID management system 210. Note that the ID management system 210 can be essentially any system/provider that performs authentication given credentials (e.g., a security ID and password) including, for example, systems accessed through a Windows®-based security interface, e.g., Active Directory, any local Windows® XP or Windows® 2000-based machine, and so on.

In addition to authentication, the ID management system 210 (or a separate entity, not shown) has user and group management features that return authorization data (e.g., indicative of access rights and privileges) for the user, user's security group and/or application, such as the user's role (e.g., administrator, coordinator, publisher, user or other group). As can be appreciated, authentication may be performed by a separate entity from that which determines authorization data, however as will be described below, in a preferred implementation a single returned ticket for a valid user or application will be built and will serve to authenticate the user or application and identify the user's or application's role for authorization purposes. In the described example, the authentication adapter 208 may comprise a UDDI Services component in Windows® .NET Server 2003 or the like, which leverages the security APIs, user accounts and security groups in the Windows® operating system to analyze the information provided in the get_authToken message to generate the authentication information.

Assuming the credentials are validated and the role data retrieved from the ID management system 210, the authentication adapter 208 constructs a ticket 212 for the client 202, and returns the ticket (in encrypted form) in response to the client's request 204, as represented in FIG. 2 by the arrow labeled two (2). As shown in FIG. 2, the ticket typically includes information 214 comprising the security ID (e.g., a user ID), role and a date/timestamp (e.g., for purposes of expiring the ticket). Also, the ticket may include random data, sometimes referred to as salt, which makes an intercepted ticket more difficult to reverse engineer.

Once in possession of the ticket, the client provides the ticket when making a web service request (or multiple requests), thereby providing the client with access to the network services within the scope of the role identified in that ticket. This is represented in FIG. 2 by the arrow labeled three (3), and is also described below with reference to FIGS. 4 and 5. Note that the client does not (ordinarily) process any of the data in the ticket, but rather simply caches the ticket and returns it, as is, with a request for services.

Figure 3:
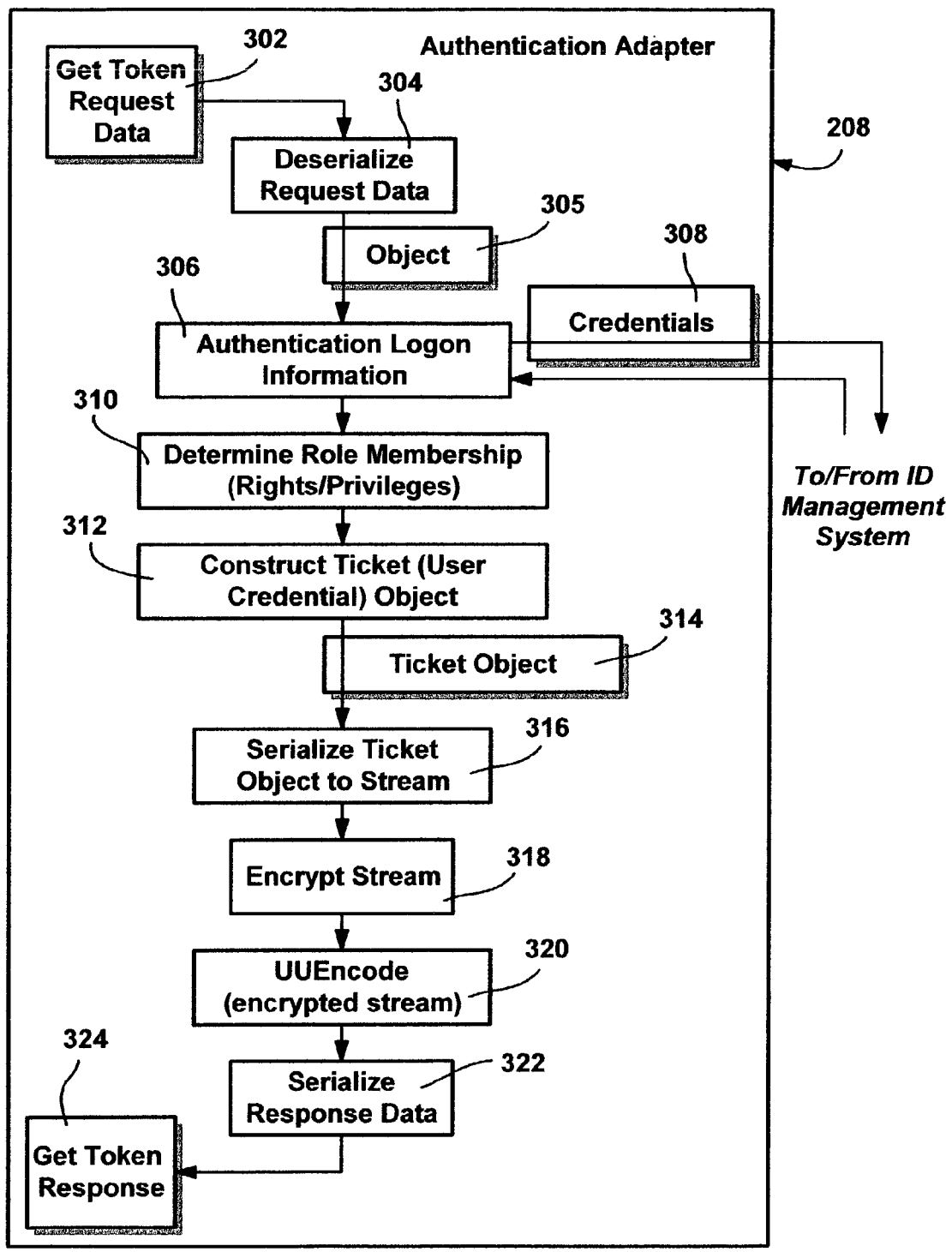
FIG. 3 is a block diagram generally representing the handling of a request for a ticket and construction of a response including the ticket in accordance with an aspect of the present invention.

In accordance with an aspect of the present invention, FIG. 3 generally describes how the authentication adapter 208 operates to process the request data 302 received in the get_auth token request. At block 304, the authentication adapter 208 deserializes the stream of data 302 into a data structure (e.g., object 305) that provides the authentication adapter 208 with random access to the data, so that the security ID and password attributes can be accessed as needed. For example, in the implementation in which a get_authToken XML SOAP message is received, de-serialization converts the request data into an instance of a class in memory, providing direct access to the attributes in the request, and in particular the security ID and password attributes. As can be understood, since XML and SOAP are text-based and not platform-specific, the request can be sent by software running on virtually any computing platform, independent of the platform on which authentication is performed.

At block 306, authentication is performed by passing the appropriate credentials 308 (e.g., including the security ID and password) to the ID management system 210 (FIG. 2). In an example implementation in which a user ID is received, this may be accomplished by invoking the (well-documented) Windows®-based LogonUser API, which verifies that the values specified are valid Windows® credentials, and, in a network environment, determines where (e.g., which key distribution center) to send the information for verification:

LogonUser(
        <user id>, . . . ,
        <password> . . . )

If unsuccessful, the request can be rejected, e.g., a failure/retry response may be returned some number of times.

Assuming logon is successful, block 310 represents an algorithm and/or other retrieval mechanism that determines the role membership that corresponds to these credentials. For example, based on membership in a set of Windows® security groups, the algorithm establishes the level of privileges that should be associated with the specified credentials. In one .NET-based implementation, the level of privileges may correspond to a defined role (e.g., administrator, coordinator, publisher, user or other group) having a corresponding scope.

With the authenticated user's or application's authorization (e.g., role membership) data, the authentication adapter 208 constructs a ticket, as represented by block 312. To this end, an instance of a ticket class 314 is created in memory, and is initialized with the identity of the user/application, the privileges (role) associated with the user/application, a date/time stamp indicating the time at which the ticket was created, and random data (sometimes referred to as salt).

To prepare the ticket for returning, the authentication adapter 208 serializes the ticket object 314, as represented by block 316, by writing the ticket object into a sequential stream of bytes in memory. The byte stream is then cryptographically encoded to secure it's contents from improper use, as represented by block 318.

Block 320 UUEncodes this stream, that is, transforms this encrypted, binary byte stream into a text stream appropriate for transmission as part of an XML message over the HTTP protocol. At this time, the ticket can be returned to the client. To this end, in an HTTP/SOAP transmission environment, for example, block 322 populates a message object with the text stream, and serializes the response out to an HTTP network stream. In one implementation, the response, in the form of an authToken SOAP message, contains the authentication ticket (in an element named authinfo) as shown in the example below:

```
<?xml version="1.0" encoding="UTF-8" ?>
<Envelope xmlns="http://schemas.xmlsoap.org/soap/envelope/">
    <Body>
        <authToken generic="2.0" xmlns="urn:uddi-org:api_v2" operator="MS">
            <authInfo>
1BAAAAAAAH6VB!Md1vaYb62mE53PvBDxDFYWLbPS8MDTu*hBPJvgKqgW7w3gpMPQ4*
;1AAAAAAAAG53yS*ZLxRCYLBy8GSwQn5BLNncal4vCs9rTxLIKZmSMYabUCipL8enM
1JwCZFXJD4lodcQWdYd!l8RS!ufaBwCC3L!lcNfS5WMBfL!ek8hG8X66TxyN86fPdt
THLPfcMRNcC8I8VsvMnU1fp4hCD3iBGVe40Wrjzz0E$</authInfo>
        </authToken>
    </Body>
</Envelope>
```

Figure 4:
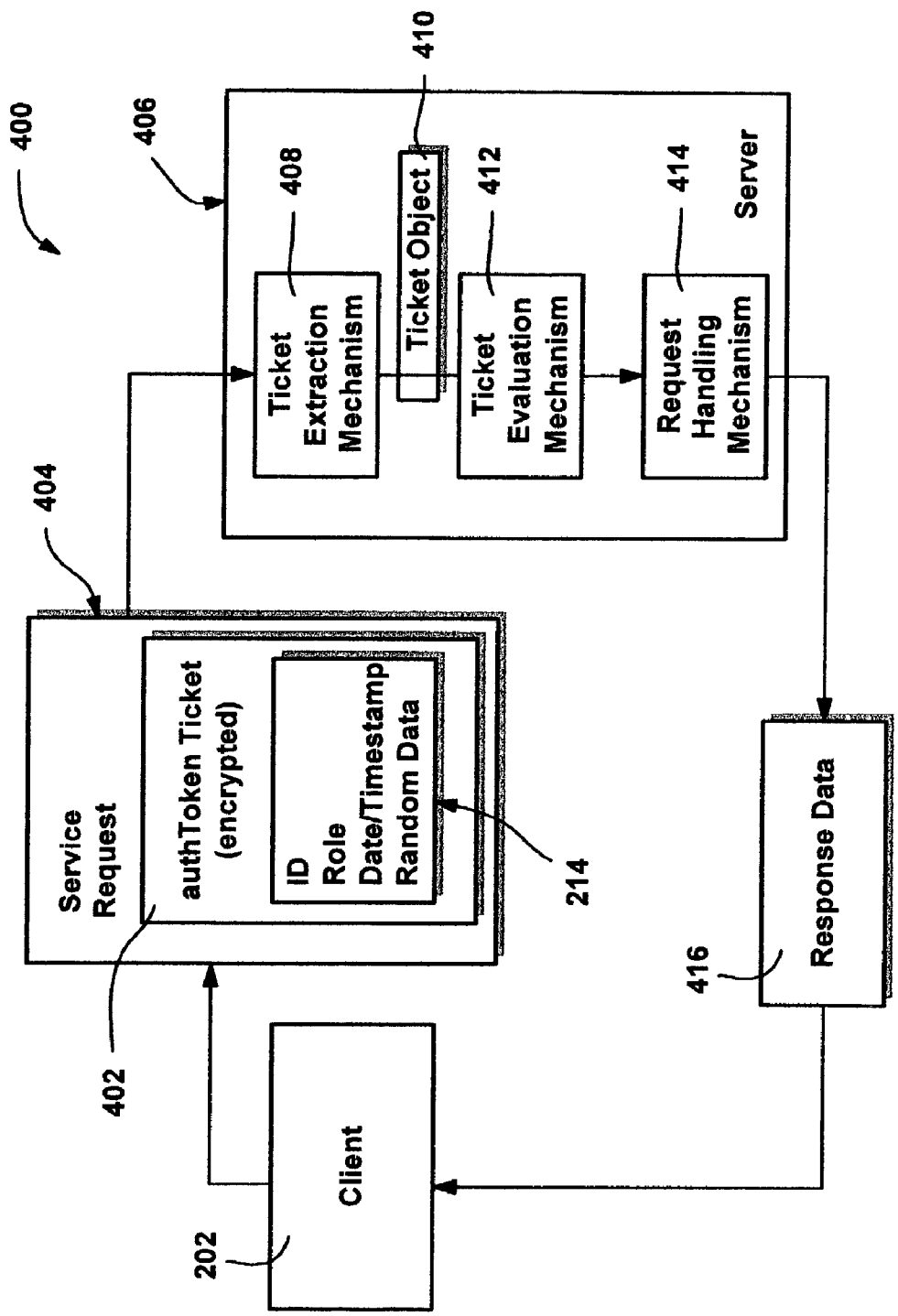
FIG. 4 is a block diagram generally representing the exchange of a service request that includes a previously returned ticket, and a corresponding response, in accordance with an aspect of the present invention.

As represented in FIG. 4, once a ticket is in possession of the client 202, in a network environment 400 the client 202 may attach a copy of the authentication ticket 402 containing the identification and authorization information 214 to at least one subsequent service request 404 that requires authentication, (e.g., save_service or delete_tModel in a UDDI environment), as set forth in the following example:

```
<?xml version="1.0" encoding="UTF-8" ?>
<Envelope xmlns="http://schemas.xmlsoap.org/soap/envelope/">
<Body>
    <save_business generic="2.0" xmlns="urn:uddi-org:api_v2">
        <authInfo>1BAAAAAAAH6VB!Md1vaYb62mE53PvBDxDFYWLbPS8MDTu*hBPJv
gKqgW7w3gpMPQ4*;1AAAAAAAAG53yS*ZLxRCYLBy8GSwQn5BLNncal4vCs9rTXLIKZ
mSMYabUCipL8enM1JwCZFXJD4lodcQWdYd!l8RS!ufaBwCC3L!lcNfS5WMBfL!ek8h
G8X66TxyN86fPdtTHLPfcMRNcC8I8VsvMnU1fp4hCD3iBGVe40Wrjzz0E$</authIn
fo>
        <businessEntity businessKey="" operator="MS">
            <name xml:lang="en">MY BUSINESS</name>
            <description xml:lang="en">A business
description.</description>
        </businessEntity>
    </save_business>
</Body>
</Envelope>
```

As also represented in FIG. 4, to validate the ticket and handle the service request 404, a server 406 that receives the request includes a ticket extraction mechanism 408 that can reconstruct the ticket data into a form that can be evaluated, such as by restoring the data into a ticket object 410. With the ticket object, a ticket evaluation mechanism 412 performs the logic necessary to determine whether the ticket is valid for the particular request, e.g., whether the ticket has expired, whether the request is authorized within the scope of the role for the user/application, and so on. If not a valid request, the request is denied; otherwise it is handled by a suitable request handling mechanism 414, which returns an appropriate response 416. Note that the ticket evaluation mechanism 412 and request handling mechanism 414 may be virtually any components and/or logic that can validate and handle a service request, including well-documented mechanisms, and thus are not described herein for purposes of simplicity.

Figure 5:
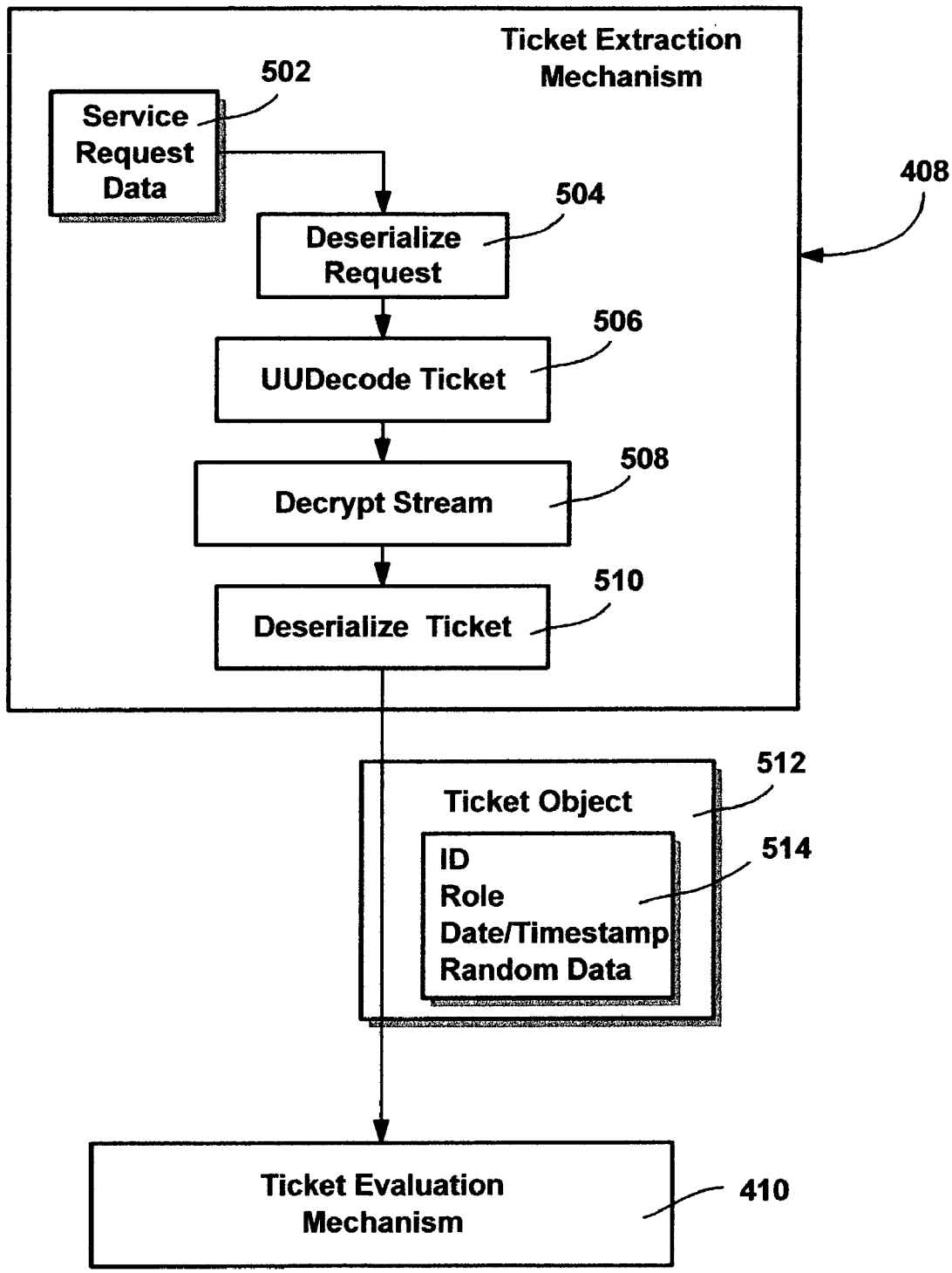
FIG. 5 is a block diagram generally representing the handling of a received request to extract the authorization information therefrom in accordance with an aspect of the present invention.

FIG. 5 describes the general operation of the ticket extraction mechanism 408, which receives a stream of data 502 corresponding to the service request. At block 504, the ticket extraction mechanism 408 deserializes the request into a data structure such as an object that provides random access to the ticket data, e.g., within the <auth_Info> tag. The ticket data is then UUDecoded back into binary by block 506, and the stream decrypted with the appropriate decryption process 508 for the type of encryption performed at block 318 of FIG. 3.

At block 510, the now decrypted ticket data is deserialized back into an instance of the ticket object 512, including the important authorization-related information 514, e.g., ID, role and date/timestamp. The random data may be discarded, although it may also have some use (e.g., as part of a checksum). In any event, the ticket object 512 now provides random access to the ticket data 514, which the ticket evaluation mechanism 410 can use in determining whether the user's or application's accompanying request is authorized.

As can be seen from the foregoing detailed description, there is provided a method and system to provide authentication and authorization services to network (e.g., web) service users and applications. The authentication and authorization can take place in a SOAP-based web service environment, use an ID management system that is independent of the platform of the client, and be accomplished within the framework of UDDI specifications. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving a request for a ticket, the request comprising data in a format that is independent of any particular platform;
   deserializing the request data into a data structure that provides access to credentials within the request data;
   accessing the credentials to authenticate the credentials and determine role information based on the credentials;
   constructing a ticket including the role information, and further including date information or a security ID, or both date information and a security ID;
   preparing the ticket for transmission;
   inserting the prepared ticket into a response message that is formatted in a format that is independent of any particular platform; and
   returning the ticket in response to the request.

2. The method of claim 1 wherein preparing the ticket for transmission comprises serializing the ticket into a data stream.

3. The method of claim 2 wherein the data stream comprises binary data, and wherein preparing the ticket for transmission further comprises converting the binary data to ASCII data.

4. The method of claim 2 wherein preparing the ticket for transmission further comprises encrypting the data stream into encrypted binary data.

5. The method of claim 4 wherein preparing the ticket for transmission further comprises converting the data stream from the encrypted binary data to ASCII data.

6. The method of claim 1 wherein inserting the prepared ticket comprises placing the prepared ticket into an XML message.

7. The method of claim 1 wherein inserting the prepared ticket comprises placing the prepared ticket into a SOAP message.

8. The method of claim 1 wherein inserting the prepared ticket comprises placing the prepared ticket into a UDDI authToken tag in a SOAP message.

9. The method of claim 1 wherein accessing the credentials to authenticate the credentials comprises, providing a security ID and password data to an ID management system.

10. The method of claim 1 wherein accessing the credentials to authenticate the credentials and determine role information based on the credentials comprises, providing the credentials to a Windows®-based security interface.

11. The method of claim 10 wherein providing the credentials to the Windows®-based security interface comprises passing a security ID and password data to a called function.

12. The method of claim 10 wherein providing the credentials to the Windows®-based security interface comprises passing a userID and a password data to a LogonUser application programming interface.

13. The method of claim 1 further comprising, receiving the ticket from a client in association with a service request, and in response, authorizing the client to receive a service.

14. The method of claim 1 further comprising, receiving the ticket from a client in association with service request data, and deserializing the service request data.

15. The method of claim 1 further comprising, receiving the ticket from a client in association with service request data, and extracting from the service request data a data structure that provides access to information within the ticket.

16. The method of claim 15 wherein extracting from the service request data a data structure comprises deserializing the service request data.

17. The method of claim 16 wherein extracting from the service request data a data structure comprises converting ASCII data including the ticket information into binary data including the ticket information.

18. The method of claim 17 further comprising, decrypting the binary data into unencrypted data.

19. The method of claim 18 further comprising, deserializing the unencrypted data into a data structure that provides access to the ticket information including the role information.

20. The method of claim 19 further comprising, authorizing the client to receive a service based at least in part on an evaluation of the role information.

21. A computer-readable medium having computer-executable instructions for performing the method of claim 1.

22. In a computer network having a client, a system comprising:
 a server connected to the client to receive requests from the client, including a client request to receive a ticket, the request comprising data in a format that is independent of any particular platform;
 an authentication adapter associated with the server, the authentication adapter invoked by the server to handle the ticket request received from the client, the authentication adapter configured to:
  1) deserialize the request data into a data structure that provides access to credentials within the request data;
  2) access the credentials to authenticate the credentials;
  3) determine role information based on the credentials;
  4) construct a ticket including the role information, and further including a security ID or date information, or both a security ID and date information;
  5) prepare the ticket for transmission;
  6) insert the prepared ticket into a response message that is formatted in a format that is independent of any particular platform; and
  7) provide the response message to the server; and
 the server returning the ticket to the client in response to the request.

23. The system of claim 22 wherein the authentication adapter prepares the ticket for transmission by serializing the ticket into a data stream, encrypting the data stream into encrypted binary data, and converting the encrypted binary data to ASCII data.

24. The system of claim 22 wherein the authentication adapter serializes the response message.

25. The system of claim 22 wherein the response message comprises an XML message.

26. The system of claim 22 wherein the response message comprises a SOAP message.

27. The system of claim 22 wherein the authentication adapter inserts the prepared ticket by placing the prepared ticket into a UDDI authToken tag in a SOAP message.

28. The system of claim 22 wherein the authentication adapter accesses the ticket to authenticate the credentials by providing the credentials to an ID management system.

29. The system of claim 28 wherein the ID management system includes a Windows®-based security interface.

30. The system of claim 29 wherein the Windows®-based security interface comprises a LogonUser application programming interface.

31. The system of claim 22 further comprising, another server that receives the ticket from the client in association with a service request, and in response, extracts the ticket from the client, authorizes the client based on the ticket, and provides a service to the client in response to the service request.

32. The system of claim 31 wherein the other server extracts the ticket by deserializing at least part of the service request data corresponding to the ticket into a data stream, decoding the data stream into encrypted binary data representing the ticket, decrypting the encrypted binary data into a decrypted data stream, and deserializing the decrypted data stream into a data structure that provides access to information within the ticket.

33. The system of claim 22 further comprising, receiving the ticket from a client in association with a service request, extracting the ticket from the client, determining whether the ticket authorizes the client to receive a requested service, and if so, providing the requested service to the client in response to the service request.

34. In a computing environment, a method comprising:
 receiving a request for a ticket, the request comprising data in a UDDI get_authToken request and including credentials;
 deserializing the request data into an object that provides access to the credentials;
 providing the credentials to an ID management system that authenticates the credentials and determines role information based on the credentials;

constructing a ticket including a security identifier, the role information and date information;

preparing the ticket for transmission, including encrypting the ticket and inserting the ticket into a UDDI authToken ticket response message; and returning the ticket in response to the request.

35. The method of claim 34 wherein preparing the ticket for transmission further comprises converting binary data to ASCII data.

36. A computer-readable medium having computer-executable instructions for performing the method of claim 34.

37. In a computing environment, a method comprising:
receiving a request for a ticket, the request comprising data in a format that is independent of any particular platform;
deserializing the request data into a data structure that provides access to credentials within the request data;
accessing the credentials to authenticate the credentials and determine role information based on the credentials;
constructing a ticket including the role information;
preparing the ticket for transmission, including serializing the ticket into a data stream comprising binary data, and converting the binary data to ASCII data;
inserting the prepared ticket into a response message that is formatted in a format that is independent of any particular platform; and
returning the ticket in response to the request.

38. In a computing environment, a method comprising:
receiving a request for a ticket, the request comprising data in a format that is independent of any particular platform;
deserializing the request data into a data structure that provides access to credentials within the request data;
accessing the credentials to authenticate the credentials and determine role information based on the credentials;
constructing a ticket including the role information;
preparing the ticket for transmission, including serializing the ticket into a data stream comprising binary data, and encrypting the data stream into encrypted binary data;
inserting the prepared ticket into a response message that is formatted in a format that is independent of any particular platform; and
returning the ticket in response to the request.

39. The method of claim 38 wherein preparing the ticket for transmission further comprises converting the data stream from the encrypted binary data to ASCII data.

40. In a computing environment, a method comprising:
receiving a request for a ticket, the request comprising data in a format that is independent of any particular platform;
deserializing the request data into a data structure that provides access to credentials within the request data;
accessing the credentials to authenticate the credentials and determine role information based on the credentials, including providing the credentials to a Windows®-based security interface;
constructing a ticket including the role information;
preparing the ticket for transmission;
inserting the prepared ticket into a response message that is formatted in a format that is independent of any particular platform; and
returning the ticket in response to the request.

41. The method of claim 40 wherein providing the credentials to the Windows®-based security interface comprises passing a security ID and password data to a called function.

42. The method of claim 40 wherein providing the credentials to a Windows®-based security interface comprises passing a userID and a password data to a LogonUser application programming interface.

43. In a computing environment, a method comprising:
receiving a request for a ticket, the request comprising data in a format that is independent of any particular platform;
deserializing the request data into a data structure that provides access to credentials within the request data;
accessing the credentials to authenticate the credentials and determine role information based on the credentials, including providing the credentials to a Windows®-based security interface;
constructing a ticket including the role information;
preparing the ticket for transmission;
inserting the prepared ticket into a response message that is formatted in a format that is independent of any particular platform;
returning the ticket in response to the request; and
receiving the ticket from a client in association with service request data, and extracting from the service request data a data structure that provides access to information within the ticket.

44. The method of claim 43 wherein extracting from the service request data the data structure comprises deserializing the service request data.

45. The method of claim 44 wherein extracting from the service request data a data structure comprises converting ASCII data including the ticket information into binary data including the ticket information.

46. The method of claim 45 further comprising, decrypting the binary data into unencrypted data.

47. The method of claim 46 further comprising, deserializing the unencrypted data into a data structure that provides access to the ticket information including the role information.

48. The method of claim 47 further comprising, authorizing the client to receive a service based at least in part on an evaluation of the role information.

49. In a computer network having a client, a system comprising:
a server connected to the client to receive requests from the client, including a client request to receive a ticket, the request comprising data in a format that is independent of any particular platform;
an authentication adapter associated with the server, the authentication adapter invoked by the server to handle the ticket request received from the client, the authentication adapter configured to:
1) deserialize the request data into a data structure that provides access to credentials within the request data;
2) access the credentials to authenticate the credentials;
3) determine role information based on the credentials;
4) construct a ticket including the role information;
5) prepare the ticket for transmission, including by serializing the ticket into a data stream, encrypting the data stream into encrypted binary data, and converting the encrypted binary data to ASCII data;
6) insert the prepared ticket into a response message that is formatted in a format that is independent of any particular platform; and 7) provide the response message to the server; and the server returning the ticket to the client in response to the request.

50. In a computer network having a client, a system comprising:

a server connected to the client to receive requests from the client, including a client request to receive a ticket, the request comprising data in a format that is independent of any particular platform;

an authentication adapter associated with the server, the authentication adapter invoked by the server to handle the ticket request received from the client, the authentication adapter configured to:

1) deserialize the request data into a data structure that provides access to credentials within the request data;
2) access the credentials to authenticate the credentials;
3) determine role information based on the credentials;
4) construct a ticket including the role information;
5) prepare the ticket for transmission;
6) insert the prepared ticket into a response message that is formatted in a format that is independent of any particular platform; and
7) provide the response message to the server;

the server returning the ticket to the client in response to the request; and wherein the authentication adapter accesses the ticket to authenticate the credentials by providing the credentials to an ID management system that includes a windows®-based security interface.

51. The system of claim 50 wherein the Windows®-based security interface comprises a LogonUser application programming interface.

52. In a computer network having a client, a system comprising:

a server connected to the client to receive requests from the client, including a client request to receive a ticket, the request comprising data in a format that is independent of any particular platform;

an authentication adapter associated with the server, the authentication adapter invoked by the server to handle the ticket request received from the client, the authentication adapter configured to:

1) deserialize the request data into a data structure that provides access to credentials within the request data;
2) access the credentials to authenticate the credentials;
3) determine role information based on the credentials;
4) construct a ticket including the role information;
5) prepare the ticket for transmission;
6) insert the prepared ticket into a response message that is formatted in a format that is independent of any particular platform; and
7) provide the response message to the server;

the server returning the ticket to the client in response to the request; and another server that receives the ticket from the client in association with a service request, and in response:

1) extracts the ticket from the client including by deserializing at least part of the service request data corresponding to the ticket into a data stream, decoding the data stream into encrypted binary data representing the ticket, decrypting the encrypted binary data into a decrypted data stream, and deserializing the decrypted data stream into a data structure that provides access to information within the ticket;
2) authorizes the client based on the ticket; and
3) provides a service to the client in response to the service request.

\* \* \* \* \*